US012583399B2

(12) United States Patent
Pearce et al.

(10) Patent No.: US 12,583,399 B2
(45) Date of Patent: Mar. 24, 2026

(54) AUTONOMOUS SENSOR MOUNTING STRUCTURE FOR A WORK MACHINE

(71) Applicant: Caterpillar Global Mining Equipment LLC, Denison, TX (US)

(72) Inventors: Madeline Elizabeth Pearce, Lisle, IL (US); Michael J. Donnel, Decatur, IL (US); Nikhil Sharma, Forsyth, IL (US)

(73) Assignee: Caterpillar Global Mining Equipment LLC, Denison, TX (US)

( * ) Notice: Subject to any disclaimer, the term of this patent is extended or adjusted under 35 U.S.C. 154(b) by 274 days.

(21) Appl. No.: 18/384,247

(22) Filed: Oct. 26, 2023

(65) Prior Publication Data

US 2025/0136013 A1      May 1, 2025

(51) Int. Cl.
| | |
|---|---|
| *B60R 11/00* | (2006.01) |
| *B60R 19/48* | (2006.01) |
| *B62D 65/02* | (2006.01) |

(52) U.S. Cl.
CPC ............ *B60R 11/00* (2013.01); *B60R 19/483* (2013.01); *B62D 65/02* (2013.01); *B60R 2011/004* (2013.01); *B60R 2011/0049* (2013.01)

(58) Field of Classification Search
CPC . B60R 11/00; B60R 19/483; B60R 2011/004; B60R 2011/0049; B60R 19/48; B60R 11/02; B62D 650/02; B60W 40/02; G01D 11/30; G01D 21/02; G01S 13/931; G01S 17/931; G01S 19/38
USPC ........................................................ 180/167
See application file for complete search history.

(56) References Cited

U.S. PATENT DOCUMENTS

| | | | |
|---|---|---|---|
| 6,279,978 B1 | 8/2001 | Schreyer et al. | |
| 9,420,203 B2 | 8/2016 | Broggi et al. | |
| 10,533,302 B2 * | 1/2020 | Satou ........................ | B60R 1/06 |
| 2019/0085532 A1 * | 3/2019 | Satou ..................... | B60R 3/005 |

(Continued)

FOREIGN PATENT DOCUMENTS

| | | |
|---|---|---|
| CN | 110654321 B | 6/2022 |
| JP | 2020142649 A | 9/2020 |

(Continued)

OTHER PUBLICATIONS

Written Opinion and International Search Report for Int'l. Patent Appln. No. PCT/US2024/048147, mailed Jan. 3, 2025 (12 pgs).

*Primary Examiner* — James A Shriver, II
*Assistant Examiner* — Hilary L Johns

(57) ABSTRACT

A work machine having a frame, a ground engaging member supporting the frame, an engine supported by the frame, a control module configured to control operation of the work machine, a bumper associated with the frame forward of the engine, the bumper supporting a walkway for a person to access the engine and the control module, and an autonomous sensor structure mounted to the bumper forward of the walkway having a main structure attached to the bumper, the main structure formed by a pair of vertical posts, a middle cross member, a top cross member, and a diagonal support, each extending between the pair of vertical posts, a pair of rear-facing angled supports extending from the top cross member and attached to the frame such that the walkway is unobstructed, and a plurality of sensors mounted to the main structure and connected to the control module.

20 Claims, 8 Drawing Sheets

(56)                    References Cited

U.S. PATENT DOCUMENTS

2019/0382005 A1 *  12/2019  Nishi .................. A01B 69/001
2021/0276645 A1     9/2021  O'Donnell et al.

FOREIGN PATENT DOCUMENTS

JP          2021100391 A     7/2021
JP          2022036628 A     3/2022

* cited by examiner

70

Providing Work Machine With Bumper Having Walkway — 71

Providing Main Mounting Structure — 72

Attaching Rear Facing Angled Supports — 73

Mounting Autonomous Sensors To Structure — 74

Mounting Main Structure To Front Of Bumper — 75

Attach Angled Supports To Frame Of Work Machine — 76

AUTONOMOUS SENSOR MOUNTING STRUCTURE FOR A WORK MACHINE

TECHNICAL FIELD

The present disclosure generally relates to work machines, and more specifically relates to autonomous sensor mounting structures for work machines.

BACKGROUND

Mobile work machines may be used in the heavy industries such as mining, construction, and the like to transport materials and personnel. These work machines are often large in size, and require an operator, e.g., a driver, to manually operate the machine in order for the machine to perform its designated/intended operations. Autonomous machines provide a number of benefits for automating simple, repetitive tasks at a work site. In particular, such machines may be capable of autonomously navigating around work sites and performing one or more tasks with little or no intervention by an operator. Workers may be remotely located from such machines and may be able to monitor multiple autonomous machines operating at any given site.

Autonomous machines may include control systems configured to receive information regarding, for example, the surrounding terrain, upcoming obstacles, a particular path, etc., and to automatically respond to this information in place of a human operator by commanding a series of maneuvers so that the vehicle is able to negotiate the terrain, avoid the obstacles, or track a particular path with little or no human intervention.

Autonomous machines rely on a variety of sensors in order to accurately position and guide the machine. Such sensors may include global positioning sensors (GPS), radio detecting and ranging (RADAR) sensors, light detecting and ranging (LIDAR) sensors, among others. These sensors may be required to be located in advantageous positions relative to the work machine in order to accurately sense location of the work machine. For example, GPS sensors may be required to be mounted high relative to the machine, and RADAR and LIDAR sensors may be required to be mounted at a frontmost point of the machine.

Given the size of certain work machines, particularly in the mining and off-highway industries, these sensors may be required to be attached to a mounting structure. These mounting structures may be large themselves; in order to ship the sensor structures to work sites to remotely install on work machines, the mounting structures may be required to be disassembled to fit within a standard ISO shipping container. Furthermore, the mounting structure may be installed on work machines having a walkway for workers to access and service various components of the work machine. In these work machines the mounting structure may be required to be minimally or non-obtrusive to the walkway provided on the frame of the work machine.

In light of the aforementioned shortcomings, there is a need for a work machine with an autonomous sensor mounting structure that is minimally or non-intrusive with a walkway on the bumper of the work machine such that a worker can access the walkway with the same or similar efficacy. There is also a need for a work machine with an autonomous sensor mounting structure that may be easily broken apart for shipping.

SUMMARY OF THE DISCLOSURE

In accordance with one aspect of the disclosure, a work machine may be provided. The work machine may have a frame, a ground engaging member supporting the frame, an engine supported by the frame, a control module configured to control operation of the work machine, and a bumper associated with the frame forward of the engine. The bumper of the work machine may be supporting a walkway for a person to access the engine and the control module. The work machine may also have an autonomous sensor structure mounted to the bumper forward of the walkway. The autonomous sensor structure may include a main structure attached to the bumper, the main structure formed by a pair of vertical posts, a middle cross member, a top cross member, and a diagonal support, each extending between the pair of vertical posts. The autonomous sensor structure may include a pair of rear-facing angled supports extending from both ends of the top cross member, the pair of rear-facing angled supports being attached to the frame such that the walkway is unobstructed. The autonomous sensor structure may also include a plurality of sensors mounted to the autonomous sensor structure and connected to the control module.

In accordance with another aspect of the disclosure, an autonomous sensor structure configured to be mounted to a work machine may be provided. The autonomous sensor structure may include a pair of vertical posts attached to a bumper, a middle cross member extending between the pair of vertical posts, and a top cross member extending between the pair of vertical posts. The autonomous sensor structure may include a diagonal support extending between the pair of vertical posts, the middle cross member, and the top cross member. The autonomous sensor structure may include a pair of rear-facing angled supports extending from both ends of the top cross member, the pair of rear-facing angled supports configured to be attached to the bumper such that a walkway formed into the bumper is unobstructed. The autonomous sensor structure may include a plurality of sensors mounted to the autonomous sensor structure.

In accordance with yet another aspect of the disclosure, a method of manufacturing a work machine with autonomous equipment may be provided. The method may include providing a work machine with a bumper forming a walkway for a person to walk on in order to access and service components of the work machine. The method may include the step of providing a main structure formed by a pair of vertical posts, a middle cross member between the pair of vertical posts, a top cross member between the pair of vertical posts, and a diagonal support extending between the pair of vertical posts, the middle cross member, and the top cross member. The method may include the steps of attaching a pair of rear-facing angled supports to the top cross member at a first end, and mounting a plurality of sensors to the main structure. The method may include the steps of mounting the main structure of the autonomous sensor structure to the bumper of the work machine forward of the walkway, and attaching the pair or rear-facing angled supports to the work machine at a second end. The method may include the step of connecting the plurality of sensors to a control module of the work machine.

These and other aspects and features of the present disclosure will be more readily understood when read in conjunction with the accompanying drawings.

DETAILED DESCRIPTION

Figure 1:
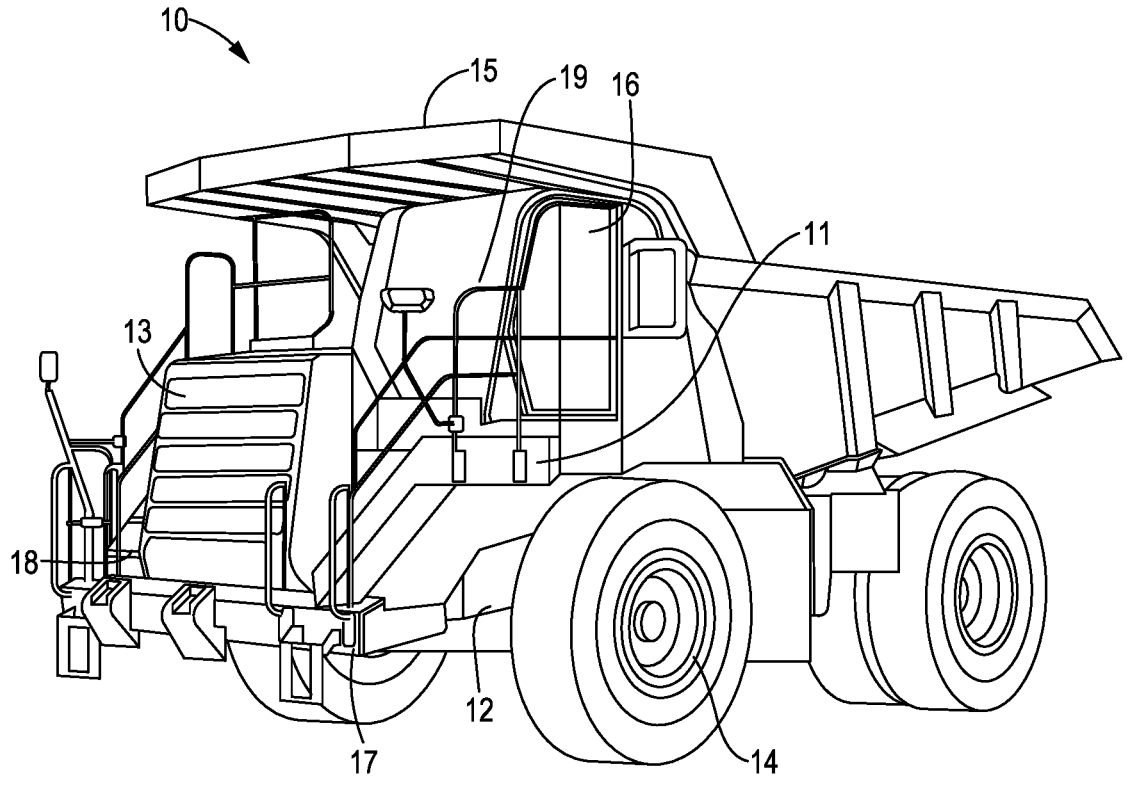
FIG. 1 is a perspective view of a work machine prior to installation of the autonomous sensor mounting structure constructed in accordance with an embodiment of the present disclosure.

Referring now to the drawings, and with specific reference to FIG. 1, a work machine is depicted and generally referred to using reference numeral 10. The work machine 10 is exemplarily embodied in the form of a mining truck. While the work machine 10 is depicted as a mining truck, it should be noted that a type of machine used is merely exemplary and illustrative in nature. It will be acknowledged that the teachings of the present disclosure can be similarly applied to other types of work machines including but not limited to off highway trucks, excavators, track-type tractors, and other types of work machines known to persons skilled in the art.

Mining machines are used to transport materials within mining sites. The exemplary work machine 10 is supported by a frame 11. The work machine 10 may include a drivetrain 12 powered by a engine 13 and driving ground-engaging members 14 contacting the ground and supporting the frame 11 in order to operate the work machine 10. The work machine 10 may also include an implement 15 to perform a work job. In the view of FIG. 1, since the work machine 10 is a mining truck, the implement 15 is exemplarily depicted as a dump body, but with other machines the implement may be other types of work implements known to persons skilled in the art. The work machine 10 may also include an operator cabin 16 for an operator to control the operation of the work machine 10. The operator cabin 16 may include a control module 19 for the operator to use to direct the work machine 10. Where the work machine 10 is fully autonomous and an operator is not present in the operator cabin 16, the work machine 10 may utilize the control module 19 to drive controlling mechanisms that direct the work machine 10.

The work machine 10 may be very large in size, weigh in excess of a million pounds, stand over two stories tall, and carry over 300 tons of payload. In order for workers to service components of the work machine 10, and the engine 13 in particular, the frame 11 may include a front bumper 17 supporting a walkway 18. The walkway 18 may allow workers to access various components on the front of the work machine 10, the engine 13, the control module 19 and provide access to the operator cabin 16.

Figure 2:
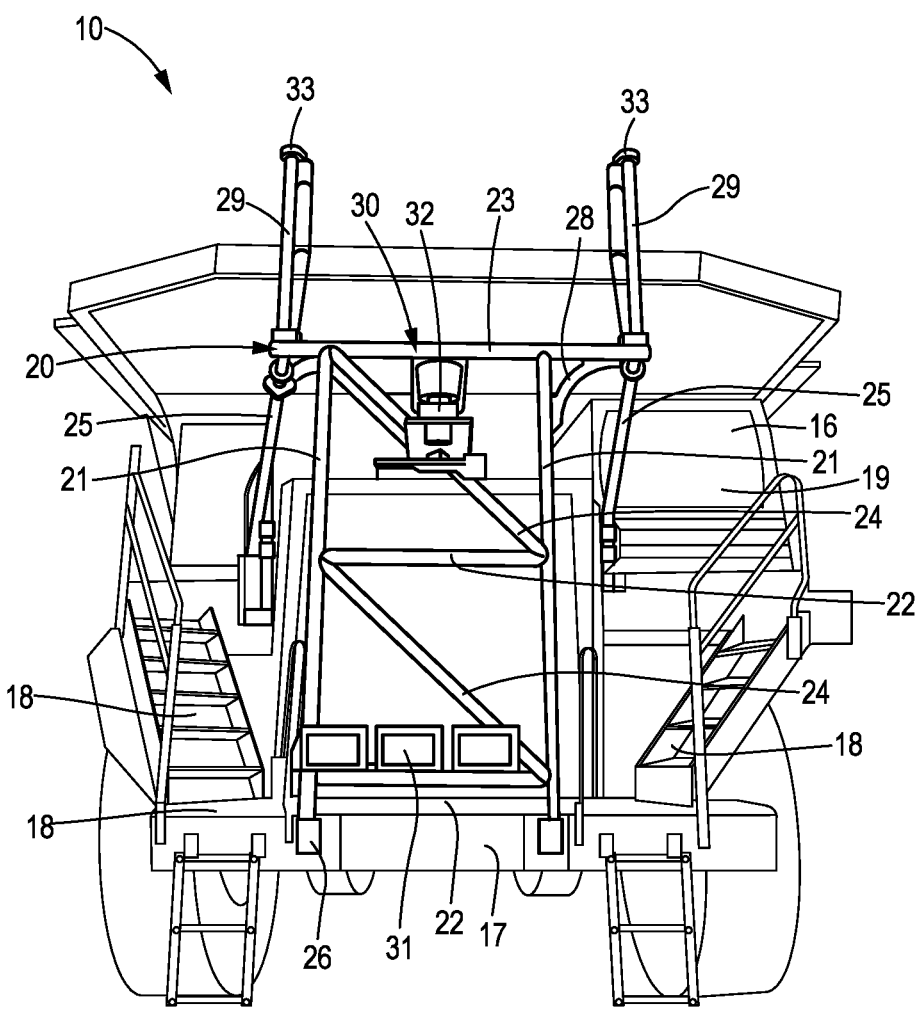
FIG. 2 is a front view of a work machine with the autonomous sensor mounting structure constructed in accordance with an embodiment of the present disclosure.
Figure 3:
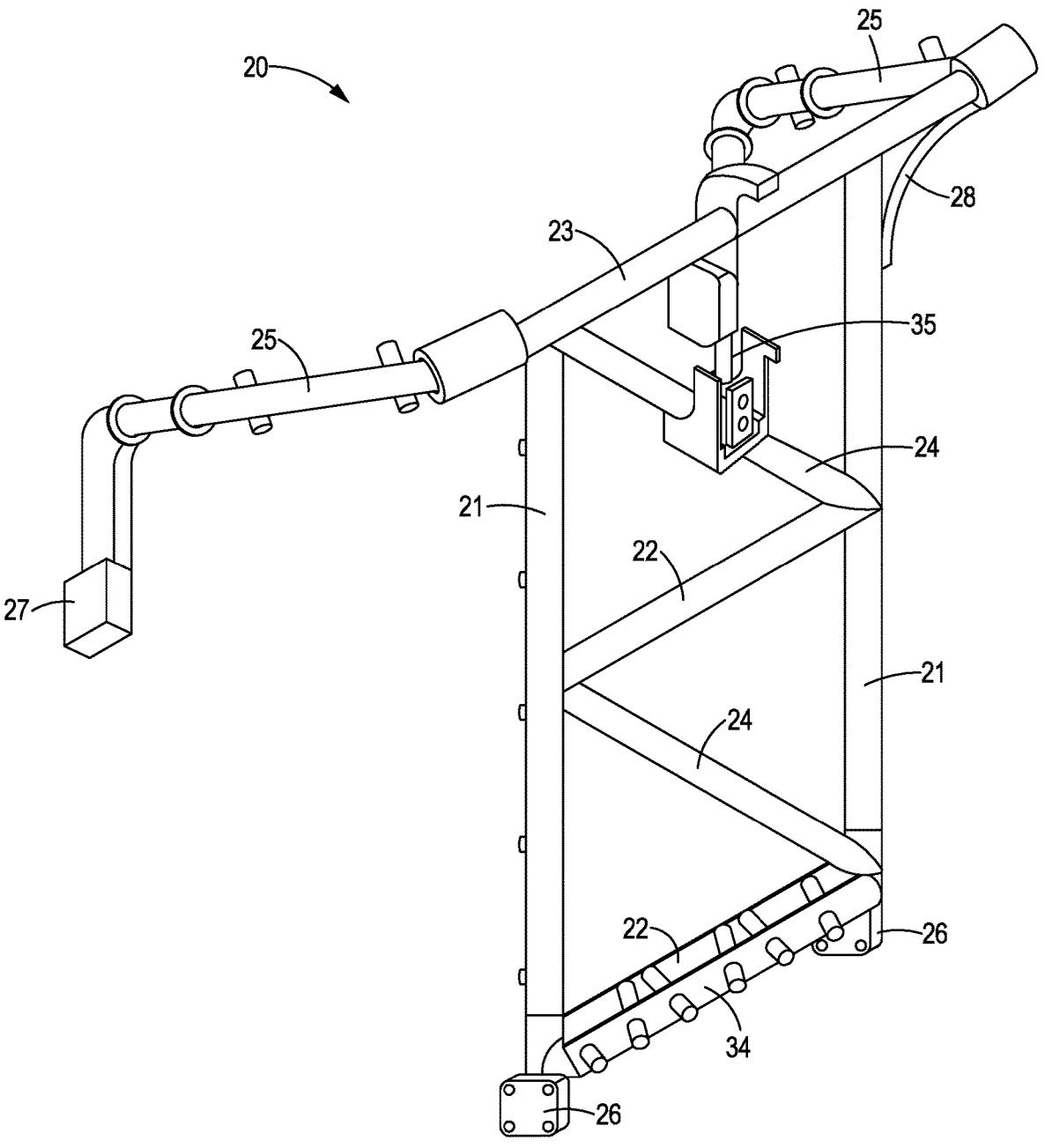
FIG. 3 is a schematic perspective view of the autonomous sensor mounting structure constructed in accordance with an embodiment of the present disclosure.
Figures 4, 5:
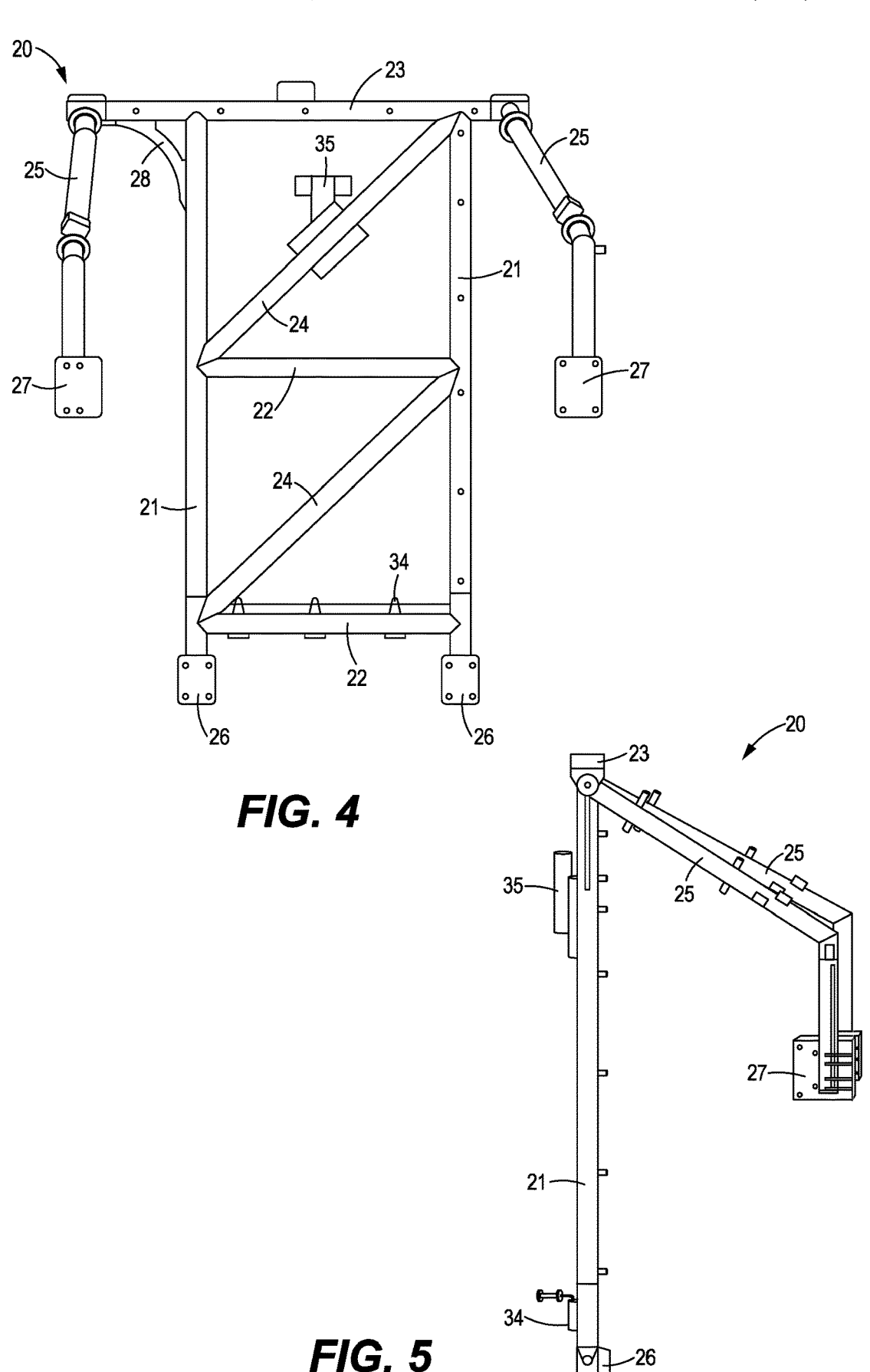
FIG. 4 a schematic rear view of the autonomous sensor mounting structure constructed in accordance with an embodiment of the present disclosure.
FIG. 5 is a schematic side view of the autonomous sensor mounting structure constructed in accordance with an embodiment of the present disclosure.

When the work machine 10 is configured to require autonomous sensory equipment 30, the work machine 10 may be provided with a mounting structure 20 for the autonomous sensory equipment 30. An exemplary embodiment of the mounting structure 20 is shown in FIG. 2 attached to the work machine 10. FIGS. 3-5 illustrate the mounting structure 20 in an assembled state but not installed on the work machine 10, and without autonomous sensory equipment 30 mounted. The mounting structure 20 may be formed of a main structure including a pair of vertical posts 21, a middle cross member 22, a top cross member 23, and a diagonal support 24. As depicted in the embodiment of FIGS. 2-5, the mounting structure 20 has two of the middle cross member 22, and two of the diagonal support 24.

The pair of vertical posts 21, the middle cross member 22, the top cross member 23, and the diagonal support 24 may be fixedly attached to one another by welding or any similar attachment means as known. A gusset plate 28 may be attached between one of the pair of vertical posts 21 and the top cross member 23.

Figure 6:
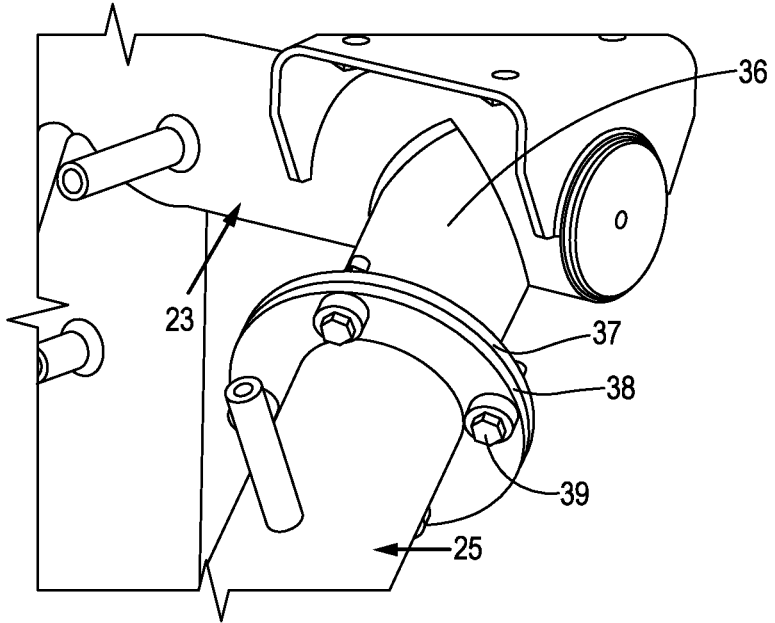
FIG. 6 is a zoomed-in schematic perspective view of a portion of the autonomous sensor mounting structure constructed in accordance with an embodiment of the present disclosure.

The mounting structure 20 may also include a pair of rear-facing angled supports 25. The pair of rear-facing angled supports 25 may be removably attached to the top cross member 23 with each of the pair of rear-facing angled supports 25 connected at a first end to either end of the top cross member 23. FIG. 6 illustrates an exemplary structure for mounting the pair of rear-facing angled supports 25 to the top cross member 23. In the embodiment of FIG. 6, the top cross member 23 may include a welded tube 36 at each end. The welded tube 36 may be welded to the top cross member 23 at a first end and may have a first flange 37 at a second end. The pair of rear-facing angled supports 25 may each have a second flange 38 corresponding to the first flange 37, each of the first flange 37 and the second flange 38 having threaded holes for flange bolts 39 to extend through. Other fastening means as known in the art may be utilized alternatively.

The mounting structure 20 may be attached to the frame 11 of the work machine 10 at several attachment points to provide stability and rigidity. As shown in FIG. 2, the main structure of the mounting structure 20 may be attached to the front of the front bumper 17 through a lower attachment plate 26 at a bottom end of each of the pair of vertical posts 21. The mounting structure may be further attached to the frame 11 via a second end of the pair of rear-facing angled supports 25 having an upper attachment plate 27 (not depicted in FIG. 2) provided at the second end. The upper attachment plate 27 may allow for the second end of each of the pair of rear-facing angled supports 25 to be attached directly to the frame 11, or to a cowl of the engine 13. While depicted in FIGS. 2-5 as utilizing bolts extending through holes in the lower attachment plate 26 and the upper attachment plate 27, the mounting structure 20 may be attached to the frame 11 through any removable and reusable fasteners as known in the art.

FIG. 2 illustrates the mounting structure 20 attached to the work machine 10 with the autonomous sensory equipment 30 attached to mounting structure 20 in order to allow for the work machine 10 to run in an autonomous mode. The work machine 10 may include a RADAR sensor 31 mounted to the middle cross member 22. While in the embodiment of FIG. 2, three RADAR sensors are utilized, any number of RADAR sensors may be utilized as known in the art. Furthermore, the work machine 10 may include a LIDAR sensor 32. In the embodiment of FIG. 2, the LIDAR sensor 32 is attached to the diagonal support 24, however, the LIDAR sensor 32 may be attached to any of the cross-members of the mounting structure 20 as deemed appropriate. As depicted by FIGS. 3-5, the mounting structure 20 may include dedicated mounting positions formed by a RADAR bracket 34 and a LIDAR bracket 35 for mounting the RADAR sensor 31 and the LIDAR sensor 32.

The autonomous sensory equipment 30 may also include a GPS sensor 33. The GPS sensor 33 may be mounted at an end of a GPS post 29 extending from the top cross member 23. The embodiment of the work machine 10 depicted in FIG. 2 may have two GPS sensors, and each GPS sensor 33 with the GPS post 29 may be located at either end of the top cross member 23.

As depicted in its fully assembled state in FIG. 3, the mounting structure 20 may provide a sufficient platform to mount autonomous sensory equipment 30 to the work machine 10. The mounting structure 20 may allow for necessary spacing between its main structure and components a the front end of the work machine 10 such as the engine 13 such that a person may still fully access the walkway 18 of the front bumper 17 without any additional impeded movement. As depicted in FIG. 2, a person may access the walkway 18 and still fit underneath the pair of rear-facing angled supports 25. Thus, the engine 13 or any other front-end component may be accessed without the need to remove the mounting structure 20 from the work machine 10.

Figure 7:
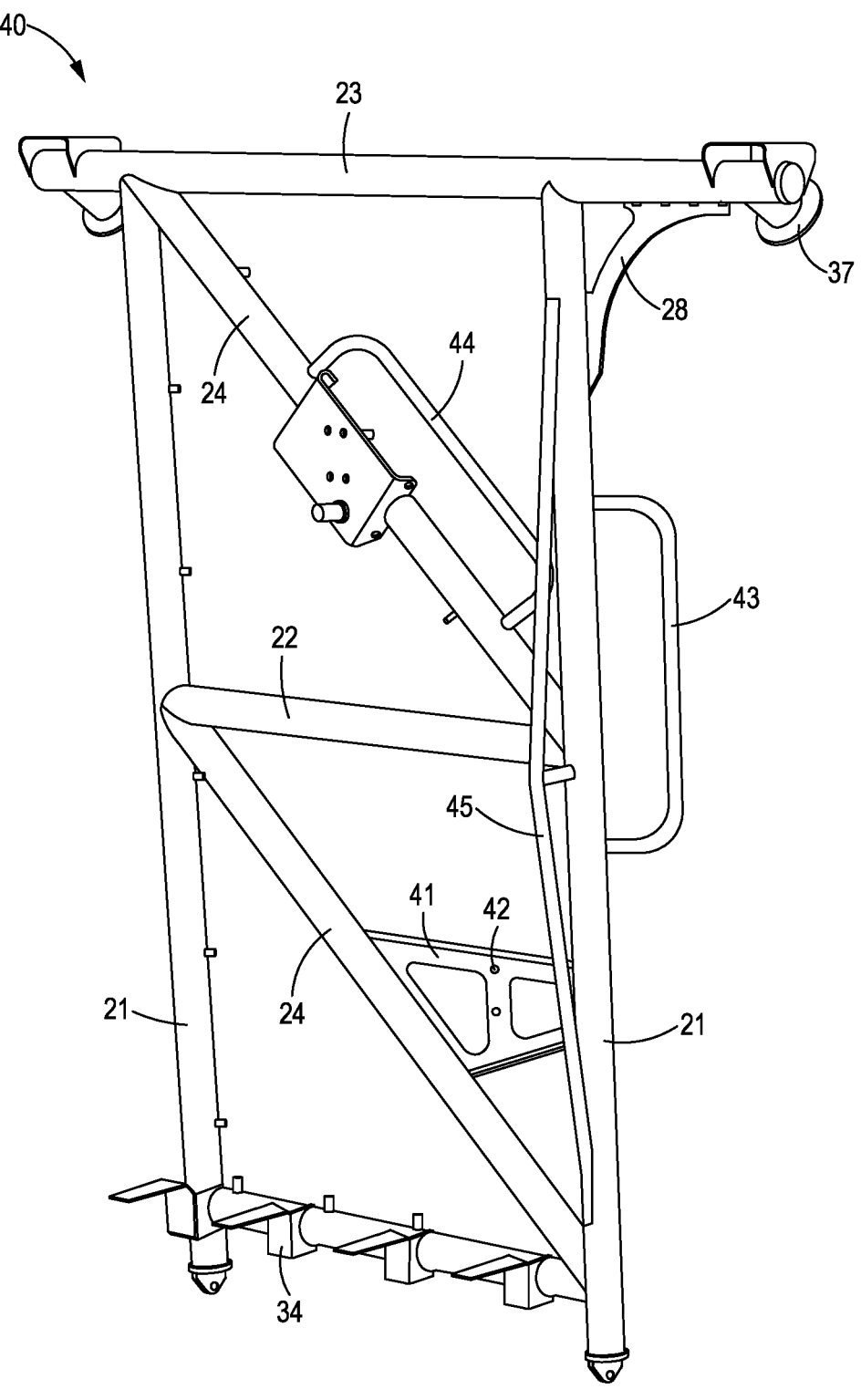
FIG. 7 is a schematic perspective view of the autonomous sensor mounting structure constructed in accordance with an embodiment of the present disclosure.
Figure 8:
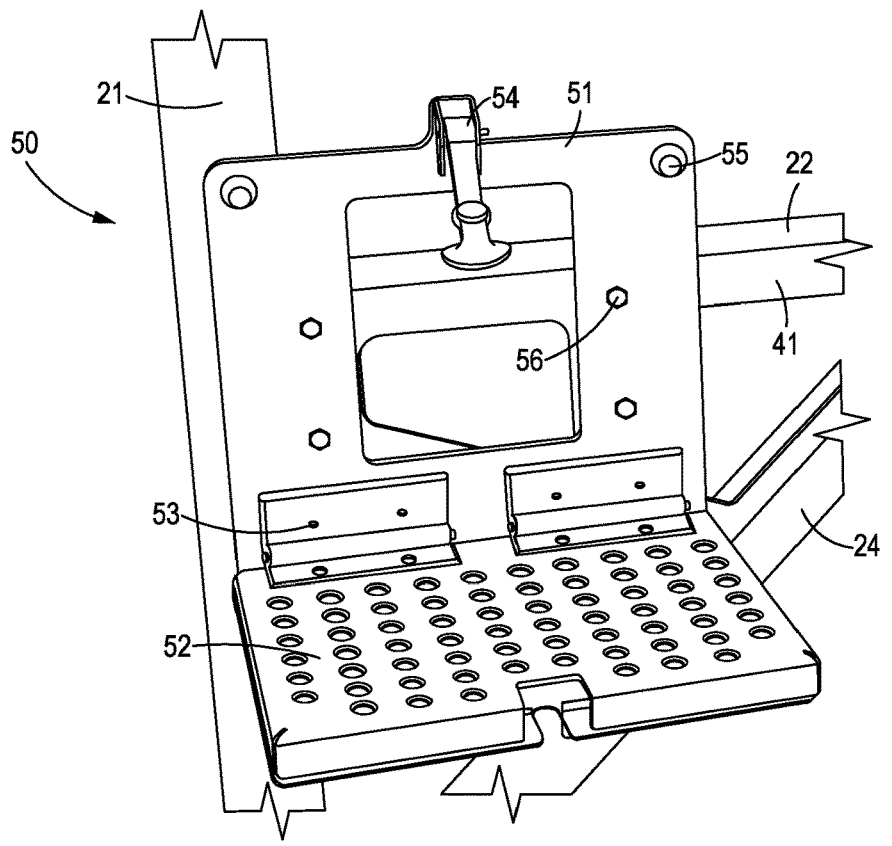
FIG. 8 is a zoomed-in schematic perspective view of a portion of the autonomous sensor mounting structure constructed in accordance with an embodiment of the present disclosure.

Periodically, components of the autonomous sensory equipment 30 may need to be maintained or cleaned. In order to do so, a scaffolding system 40 as shown in FIGS. 7-8 may be provided on the mounting structure 20. As may be seen in FIG. 7, the scaffolding system 40 may include a step mounting bracket 41 having step mounting holes 42, a first handrail 43, a second handrail 44, and a structural support 45. The step mounting bracket 41 may be attached to the mounting structure 20 between one of the pair of vertical posts 21 and the diagonal support 24 and may be configured for the removable installation of a bolt on step 50. The first handrail 43 may be provided on one of the pair of vertical posts 21 and may be angled with respect to the mounting structure 20. Similarly, the second handrail 44 may be attached to the diagonal support 24 and may be angled with respect to the mounting structure 20. The second handrail 44 may be angled differently as the first handrail 43 such that an operator may have a variety of options for holding onto the scaffolding system 40. The structural support 45 may be provided on the one of the pair of vertical posts 21, and angled in a forward direction of the work machine 10.

The bolt on step 50 is shown attached to the step mounting bracket 41 in FIG. 8. The bolt on step 50 may be formed by a step mounting plate 51 and a step plate 52, connected to each other through a hinge 53 such that the bolt on step 50 is foldable. The step mounting plate 51 may further include a step latch 54 such that the bolt on step 50 can be stored in a closed position. An isolator may be included on the step mounting plate 51 in order to prevent vibration of the components of the bolt on step 50 in the closed position. The bolt on step may be mounted to the step mounting bracket 41 via step mounting bolts 56 extending through the step mounting plate 51 and into the step mounting holes 42 of the step mounting bracket 41.

Figure 9:
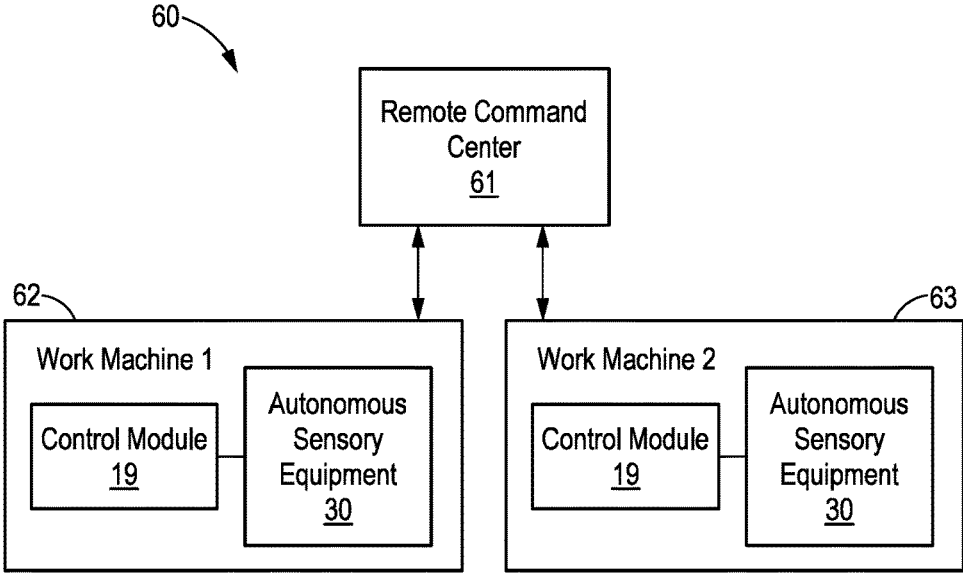
FIG. 9 is a schematic diagram depicting a fleet of work machines being controlled remotely in accordance with an embodiment of the present disclosure.

Once the mounting structure 20 is attached to the work machine 10, the autonomous sensory equipment may be connected to the control module 19 such that the work machine 10 may be controlled by a remote machine interface 60. FIG. 9 shows an exemplary embodiment of a fleet of work machines being controlled remotely through the remote machine interface 60. A remote command center 61 may communicate with each work machine 10 to monitor and control autonomous operation. FIG. 9 shows a first work machine 62 and a second work machine 63 communicating with the remote command center 61. In each of the first work machine 62 and the second work machine 63, the autonomous sensory equipment 30 is connected to and communicates with the control module 19. In turn, the control module 19 communicates with the remote command center 61. Therefore, a work site may operate a single remote command center 61 and may control and monitor a fleet of autonomous work machines 10.

INDUSTRIAL APPLICABILITY

In operation, the teachings of the present disclosure can find applicability in many industries including but not limited to machines used in the earth moving, mining, agricultural, and construction industries. While depicted and described in conjunction with a mining machine, such teachings can also find applicability with other machines such as off highway trucks and the like.

Figure 10:
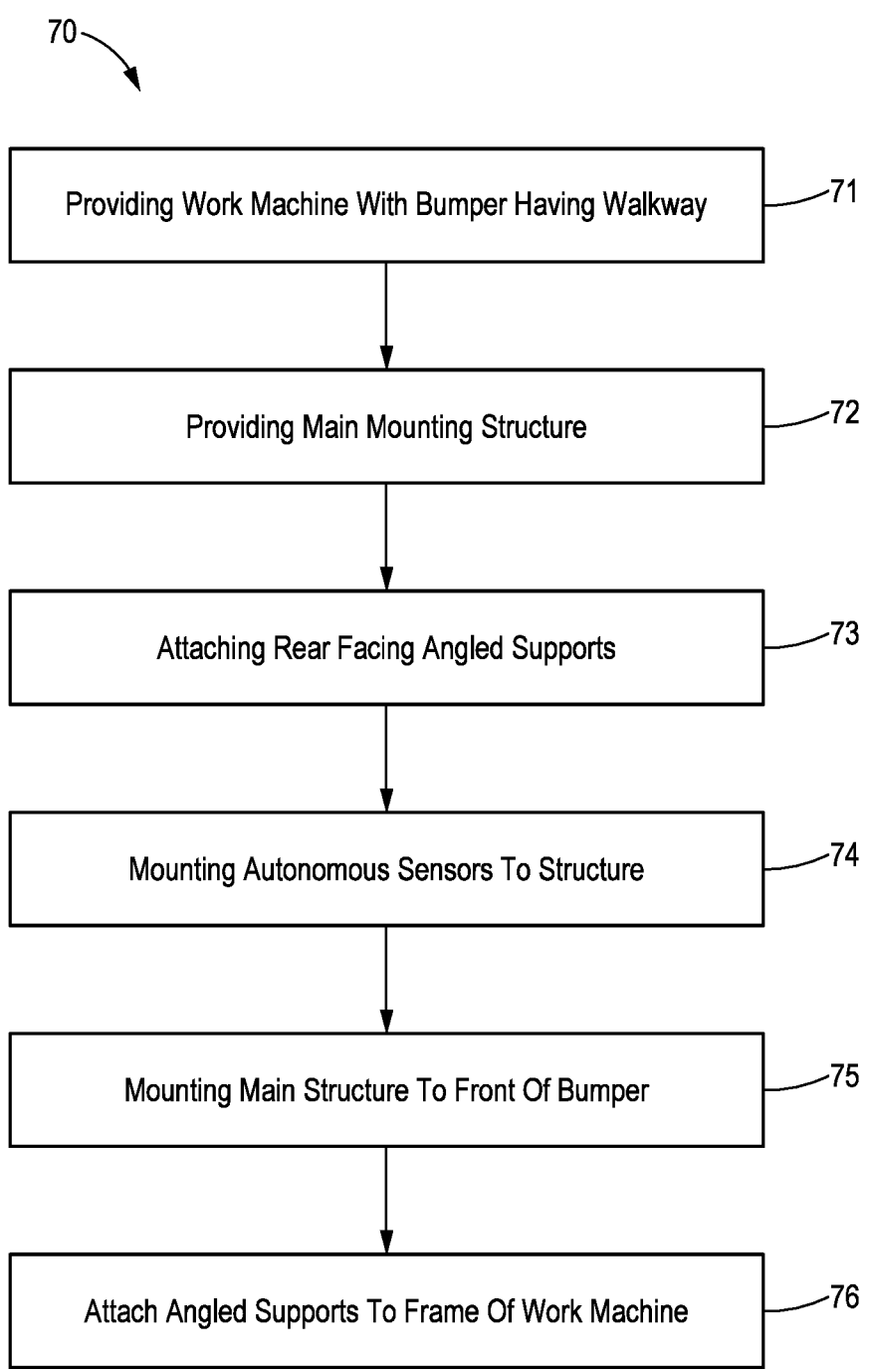
FIG. 10 is a flowchart depicting a sample sequence of steps which may be practiced in accordance with a manufacturing a work machine with autonomous equipment of the present disclosure.

FIG. 10 illustrates a visual representation of a method 70 of manufacturing the work machine 10 with autonomous equipment located on the mounting structure 20 as represented visually in FIG. 2. In a first step 71, the work machine 10 is provided having the frame 11 with the front bumper 17 including a walkway 18. The work machine 10 may be designed as a fully autonomous vehicle, or may be semi-autonomous and may include the operator cabin 16.

In order to provide the work machine 10 with autonomous sensing capability, the mounting structure 20 is added to the front of the work machine 10 with the necessary sensors. In a second step 72, the main structure of the mounting structure 20 formed by the pair of vertical posts 21, the middle cross member 22, the top cross member 23, and diagonal support 24. The main structure may be joined together in a fixed form through welding, or any other suitable method known in the art. The mounting structure 20 may be fully formed in a third step 73 by attaching the pair of rear-facing angled supports 25 to either end of the top cross member 23 at a first end of each of the pair of rear-facing angled supports 25. Each of the first flange 37 of the top cross member 23 may be aligned with the second flange 38 of the pair of rear-facing angled supports 25, and the flange bolts 39 may be placed through the threaded holes of the first flange 37 and the second flange 38, thereby joining the two.

The autonomous sensory equipment 30 may then be added to the mounting structure 20. In a fourth step 74, a plurality of sensors are mounted to the main structure of the mounting structure 20. The autonomous sensory equipment 30 forming the plurality of sensors may include the RADAR sensor 31, the LIDAR sensor 32, and the GPS sensor 33. The fourth step 74 may further include mounting the RADAR sensor 31 to the middle cross member 22, may include mounting the LIDAR sensor 32 to one of either of the middle cross member 22 or the diagonal support 24, and may include mounting the GPS sensor 33 to a topmost end of the GPS post 29 extending vertically from the top cross member 23.

The mounting structure 20 is then attached to the work machine 10. In a fifth step 75, the mounting structure 20 may be attached to the front of the front bumper 17 through a lower attachment plate 26 at a bottom end of each of the pair of vertical posts 21. In a sixth step 76, the mounting structure 20 may be attached to the frame 11 via the second end of the pair of rear-facing angled supports 25 having an upper attachment plate 27 provided at the second end.

The method 70 of manufacturing the work machine 10 describes attaching the mounting structure 20 with a plurality of sensors for autonomous operation of the work machine 10. The mounting structure 20 may be added to the work machine 10 during initial manufacture of a fully autonomous or semi-autonomous work machine, or may be retrofit onto the work machine to provide autonomous capability to a previously non-autonomous work machine.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A work machine comprising:
a frame;
a ground engaging member supporting the frame;
an engine supported by the frame;
a control module configured to control operation of the work machine;
a bumper associated with the frame forward of the engine, the bumper supporting a walkway for a person to access the engine and the control module; and
an autonomous sensor structure mounted to the bumper forward of the walkway, the autonomous sensor structure including:
a main structure attached to the bumper, the main structure formed by a pair of vertical posts, a middle cross member, a top cross member, and a diagonal support, each extending between the pair of vertical posts;
a pair of rear-facing angled supports extending from both ends of the top cross member, the pair of rear-facing angled supports being attached to the frame such that the walkway is unobstructed;
a plurality of sensors mounted to the main structure and connected to the control module.

2. The work machine of claim 1, wherein the pair of rear-facing angled supports are removably attached to the ends of the top cross member.

3. The work machine of claim 1, wherein the plurality of sensors further includes a RADAR sensor mounted to the middle cross member.

4. The work machine of claim 1, wherein the plurality of sensors further includes a LIDAR sensor mounted to either the middle cross member or the diagonal support.

5. The work machine of claim 1, wherein the plurality of sensors further includes a GPS sensor mounted to a post extending vertically from the top cross member.

6. The work machine of claim 1, wherein the control module is mounted in a cabin on the work machine and an operator controls operation of the work machine through the control module.

7. The work machine of claim 1, wherein the work machine is fully autonomous, and the work machine is operated entirely by the control module through information transmitted to the control module by the plurality of sensors.

8. An autonomous sensor structure configured to be mounted to a work machine, comprising:
a pair of vertical posts attached to a bumper;
a middle cross member extending between the pair of vertical posts;
a top cross member extending between the pair of vertical posts;
a diagonal support extending between the pair of vertical posts, the middle cross member, and the top cross member;
a pair of rear-facing angled supports extending from both ends of the top cross member, the pair of rear-facing angled supports configured to be attached to the bumper such that a walkway formed by the bumper is unobstructed; and
a plurality of sensors mounted to the autonomous sensor structure.

9. The autonomous sensor structure of claim 8, wherein the pair of rear-facing angled supports are removably attached to the ends of the top cross member.

10. The autonomous sensor structure of claim 9, wherein in a disassembled state, the autonomous sensor structure is dimensioned such that when the pair of rear-facing angled supports are removed, the autonomous sensor structure may fit within an ISO shipping container.

11. The autonomous sensor structure of claim 8, wherein the plurality of sensors further includes a RADAR sensor, and the middle cross member is configured to provide a mounting location for the RADAR sensor.

12. The autonomous sensor structure of claim 11, wherein the RADAR sensor is formed by three RADAR radio units mounted to a cross member located proximate to the bumper.

13. The autonomous sensor structure of claim 8, wherein the plurality of sensors further includes a LIDAR sensor, and one of either the middle cross member or the diagonal support is configured to provide a mounting location for the LIDAR sensor.

14. The autonomous sensor structure of claim 8, further comprising a post extending vertically from the top cross member, and the plurality of sensors includes a GPS sensor mounted to a topmost end of the post.

15. A method of manufacturing a work machine with autonomous equipment, comprising;
providing the work machine with a bumper forming a walkway for a person to walk on in order to access and service components of the work machine;
providing a main structure formed by a pair of vertical posts, a middle cross member between the pair of vertical posts, a top cross member between the pair of vertical posts, and a diagonal support extending between the pair of vertical posts, the middle cross member, and the top cross member;
attaching a pair of rear-facing angled supports to the top cross member at a first end;
mounting a plurality of sensors to the main structure;
mounting the main structure to the bumper of the work machine forward of the walkway;
attaching the pair of rear-facing angled supports to the work machine at a second end; and
connecting the plurality of sensors to a control module of the work machine.

16. The method of claim 15, wherein the step of mounting the plurality of sensors further includes mounting a RADAR sensor to the middle cross member.

17. The method of claim 16, wherein the step of mounting the plurality of sensors further includes mounting three RADAR sensors to a cross member located proximate to the bumper.

18. The method of claim 15, wherein the step of mounting the plurality of sensors further includes mounting a LIDAR sensor to one of either of the middle cross member or the diagonal support.

19. The method of claim 15, wherein the step of providing the main structure further includes providing the main structure having a post extending vertically from the top cross member.

20. The method of claim 19, wherein the step of mounting the plurality of sensors further includes mounting a GPS sensor to a topmost end of the post.

* * * * *